United States Patent [19]
Valerius

[11] Patent Number: 4,460,383
[45] Date of Patent: Jul. 17, 1984

[54] METHOD AND APPARATUS FOR RECONCENTRATING LIQUID ABSORBENT

[75] Inventor: Michael M. Valerius, Houston, Tex.

[73] Assignee: Black, Sivalls & Bryson, Houston, Tex.

[21] Appl. No.: 451,340

[22] Filed: Dec. 20, 1982

[51] Int. Cl.³ .............................................. B01D 53/14
[52] U.S. Cl. ......................................... 55/32; 55/38; 55/48; 55/51; 202/181; 203/18
[58] Field of Search .................. 55/29, 32, 38, 46–51, 55/55, 195, 208; 202/181; 203/1, 18, 73, 78, 88

[56] References Cited

U.S. PATENT DOCUMENTS

| | | | |
|---|---|---|---|
| 2,689,624 | 9/1954 | Davis | 55/46 X |
| 2,990,910 | 7/1961 | Kimmell | 55/32 |
| 3,011,955 | 12/1961 | Brown | 203/88 X |
| 3,213,593 | 10/1965 | Hendrix | 55/32 |
| 3,370,636 | 2/1968 | Francis, Jr. et al. | 203/18 X |
| 3,444,052 | 5/1969 | Bracken et al. | 202/181 X |
| 3,616,598 | 11/1971 | Foral, Jr. | 55/32 |
| 3,648,434 | 3/1972 | Gravis et al. | 55/32 |
| 3,664,091 | 5/1972 | Hegwer | 55/29 |
| 3,841,382 | 10/1974 | Gravis et al. | 203/18 X |
| 3,898,058 | 8/1975 | McGill | 55/50 |
| 4,035,166 | 7/1977 | van Hecke | 55/38 |
| 4,162,145 | 7/1979 | Alleman | 55/32 |
| 4,280,867 | 7/1981 | Hodgson | 55/32 X |
| 4,322,265 | 3/1982 | Wood | 203/18 X |

Primary Examiner—Robert H. Spitzer
Attorney, Agent, or Firm—Bard, Groves & Sroufe

[57] ABSTRACT

An improved method of and apparatus for reconcentrating a liquid absorbent in an absorption system which method includes the steps of heating the rich liquid absorbent in a heating zone to vaporize a portion of the solute therefrom, flashing the partially reconcentrated absorbent into a flash separator and separating the lean liquid absorbent from the flashed vapors in the flash separator with the lean liquid absorbent being recycled to the absorption system and with the separated vapors being cooled to condense liquids and returning the stream of condensed liquids and vapors to the heating zone. The improved apparatus includes a reboiler with a heating chamber, a surge chamber, means for flowing partially reconcentrated liquid absorbent from the heating chamber to the surge chamber, a flash separator, a valve controlling the flashing of liquid from the surge chamber to the flash separator, means for discharging separated liquids from said flash separator and a vacuum pump for returning the condensed liquids and vapors to the reboiler.

2 Claims, 2 Drawing Figures

METHOD AND APPARATUS FOR RECONCENTRATING LIQUID ABSORBENT

BACKGROUND

In the dehydration of gas streams, such as natural gas carbon dioxide and others, by use of a liquid absorbent, the degree of concentration accomplished in the regeneration of the liquid absorbent is of prime importance in the effectiveness of the gas stream dehydration. It is well known that very substantial improvement in dew point depression of the natural gas stream is achieved by using a liquid absorbent which has a 99.9 percent concentration as compared to the same absorbent having a 99.5 percent concentration.

One early effort to improve this liquid absorbent concentration is shown in U.S. Pat. No. 3,105,748 wherein gas stripping was suggested to increase the concentration of the liquid absorbent flowing from the reboiler to the reservoir. This gas stripping is successful but the gas used is lost with the water vapors discharged from the reboiler.

U.S. Pat. No. 3,616,598 discloses the use of subatmospheric pressure on the reconcentration system to remove additional water from the liquid absorbent. The reduced pressure is obtained by an ejector powered by the fuel gas flow to the reboiler heater and connected to reduce the pressure on a small separator connected to the reboiler column outlet downstream of a water condenser. This system can cause the loss of liquid absorbent through the liquid outlet of the separator and operates on the total rich glycol stream, not the partially regenerated stream, hence it must handle much more water vapor.

U.S. Pat. No. 3,867,112 discloses the use of stripping gas to increase the concentration of the liquid absorbent in a closed system using a liquid seal compressor for gas recirculation and for contact between the gas and the lean liquid absorbent. This system does not discharge its stripping gas to atmosphere but when used to dehydrate gases, such as carbon dioxide, it requires much of the system to be of corrosive resistant material including a sophisticated stripping column.

Another attempt to improve reconcentration of liquid absorbent by using subatmospheric pressure is disclosed in U.S. Pat. No. 3,824,171. This system conducts the heated partially reconcentrated liquid absorbent to a subatmospheric system so that additional water vapor is removed from the liquid absorbent. With this system, several of the vessels used are subject to subatmospheric pressure and, thus have to be designed for such conditions. A separate stream of lean absorbent is circulated to the subatmospheric contactor to contact the vapors from the flashing of the partially reconcentrated absorbent to ensure that no vaporized liquid absorbent escapes from the system.

SUMMARY

The present invention provides an improved liquid absorbent reconcentration method and apparatus. The improved method includes the steps of heating the rich absorbent to vaporize a substantial portion of the absorbed vapors, flashing the partially reconcentrated liquid to a subatmospheric pressure to vaporize additional absorbed, vapors from the liquid absorbent, separating liquids and vapors from said flashing step, cooling the separated vapors to condense a portion of said vapors and delivering the condensed liquids and the vapors to the heating step. The improved apparatus includes a regeneration vessel having a heater in a heating chamber in the vessel, a surge chamber, means for delivering partially reconcentrated liquid absorbent to the surge chamber, a flash separator, means for flashing liquid absorbent from the surge chamber to the flash separator responsive to the level of liquid absorbent from the separator, means for discharging vapors from the separator, a cooler receiving the discharged vapors to condense liquids, and a vacuum pump connected to the cooler to pump liquids and vapors to the regeneration vessel.

An object of the present invention is to provide an improved method of and apparatus for reconcentrating a liquid absorbent to a high degree of concentration which does not discharge gas from the system.

A further object is to provide an improved method and apparatus for reconcentrating a liquid absorbent to a high degree of concentration which does not utilize a side stream of lean absorbent to prevent loss of absorbent from the system.

Another object is to provide an improved method of and apparatus for reconcentrating a liquid absorbent to a high degree of concentration more economically than the prior art.

A still further object is to provide an improved method of and apparatus for reconcentrating a liquid absorbent to a high degree while using less energy than the methods and apparatus of the prior art.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENT

Figure 1:
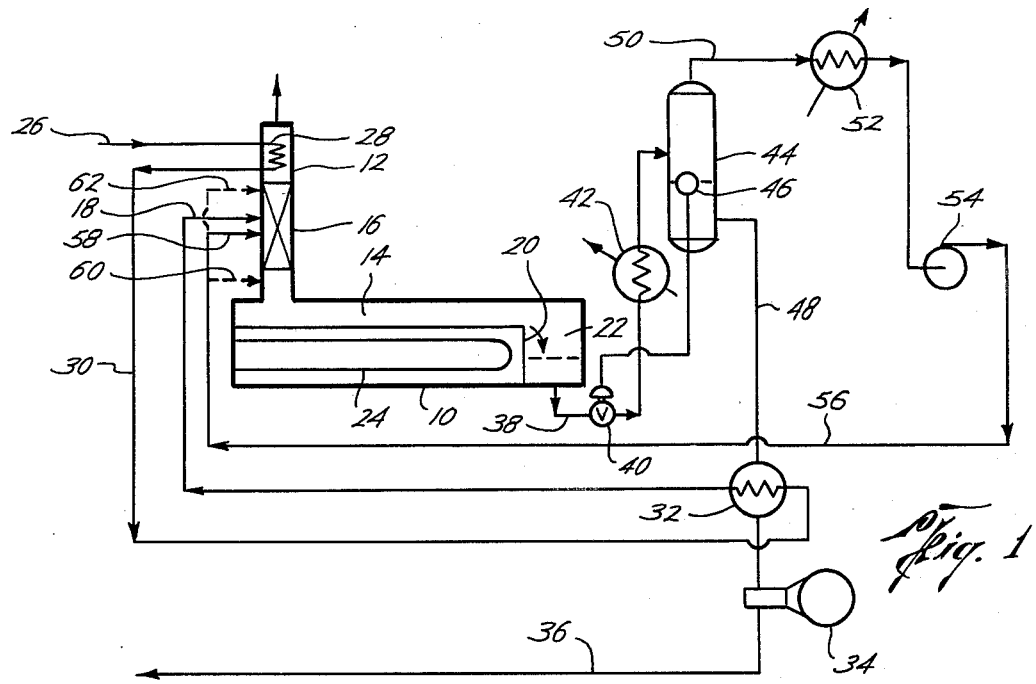
FIG. 1 is a schematic diagram of the improved reconcentration system of the present invention.

The improved system illustrated in the drawings is suitable for reconcentrating liquid absorbent which can be reconcentrated by heating and by reduction of vapor pressure. A typical example of such liquid absorbent is triethylene glycol which is commonly used in the dehydration of natural gas streams.

As shown in FIG. 1 reboiler or regeneration vessel 10 has stripping column 12 mounted thereon and in communication at its lower end with the interior of the heating chamber 14 of vessel 10. Stripping column 12 includes suitable contacting means 16 such as a packed section into which rich absorbent line 18 connects. Transverse bulkhead 20 extends across vessel 10 with heating chamber 14 on one side thereof and surge chamber 22 on the other side. Heating element 24 is positioned to heat the liquid absorbent in heating chamber 14 to drive off the vapors of the material absorbed by the absorbent liquid. Transverse bulkhead 20 extends to the level desired for the liquid absorbent in heating chamber 14.

Liquid absorbent from stripping column 12 falls into the end of heating chamber 14 away from bulkhead 20. Thus, the liquid absorbent has been regenerated, preferably to approximately 99 percent, when it flows into surge chamber 22. Further reconcentration of the liquid absorbent is provided by the additional equipment as hereinafter described.

The rich liquid absorbent from the absorption tower or contacting zone (not shown in FIG. 1) is delivered through line 26 to reflux coil 28 in the top of stripping column 12, through line 30 to heat exchanger 32 and through line 18 into stripping column 12. Lean or reconcentrated liquid absorbent is delivered to pump 34 and is pumped therefrom through line 36.

Partially reconcentrated liquid absorbent is discharged from surge chamber 22 through line 38 and is flashed through valve 40 and heater 42 into flash separator 44. Valve 40 is controlled by liquid level controller 46 on separator 44 to maintain a reservoir of liquid in the bottom of flash separator 44 so that vapors are not discharged through liquid outlet 48. It should be understood that heater 42 may be any source of heat, such as a heat exchange within or with the liquid in heating chamber 14. The purpose of heating the flashed stream is to replace the heat loss due to the vaporization of some of the liquids being flashed. This allows flash separator to operate at a higher temperature so that more vaporization occurs which results in a higher concentration of the regenerated liquid absorbent. Heater 42, however, is not required to achieve increased concentration of the absorbent.

The regenerated liquid absorbent is discharged from separator 44 through liquid outlet 48 and through heat exchanger 32 where it is cooled and then delivered to pump 34 for delivery to the absorber (not shown). The vapors are discharged from flash separator 44 through vapor outlet 50 through overhead condenser or cooler 52 which cools the vapors to partially condense them and then to liquid seal vacuum pump 54 which creates the reduced pressure on flash separator 44 and returns the condensate vapor from condenser 52 through line 56 to stripping column 12.

It is estimated that the approximate concentration of the condensed liquids flowing through line 56 will be about 95 percent and is shown to be introduced into stripping column 12 through line 58. Alternate inlets 60 and 62 are provided to allow a range of introduction points for the condensed liquids and vapors returned to reboiler 10 through line 56. It is preferred that the liquids and vapors be introduced into reboiler 10 or its stripping column 12 at a point at which the liquid therein has substantially the same concentration as the returned liquid.

If reboiler 10 is operated at a temperature of 400° F., then it is estimated that the temperature of the flash stream flowing from valve 40 would be 387° F. Reheating the flash stream to 400° F. can improve the concentration of the liquid absorbent to a concentration approaching 100 percent (99.95% for triethylene glycol) which provides a substantial improvement in the amount of absorption which the lean liquid absorbent can achieve in the absorber.

Figure 2:
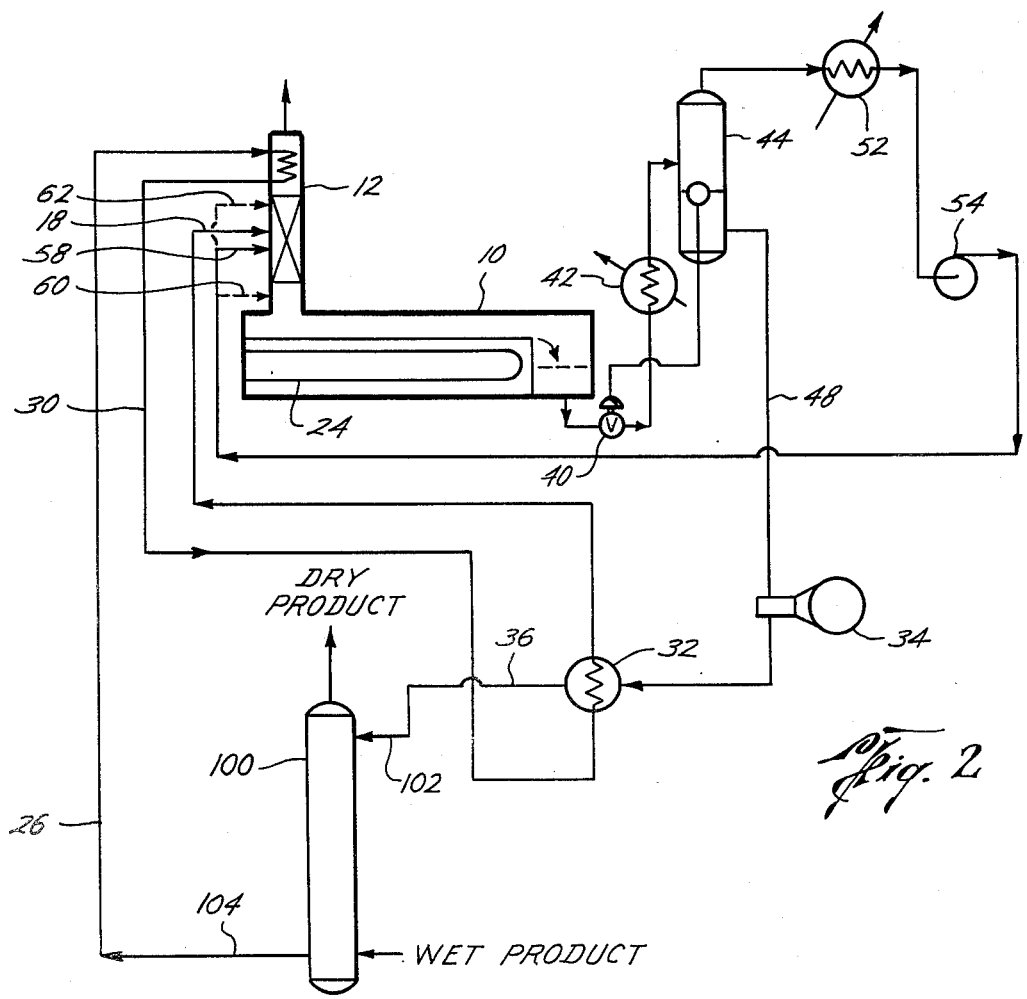
FIG. 2 is a similar schematic diagram illustrating a complete absorption system with a modified form of reconcentration system of the present invention.

The schematic diagram in FIG. 2 is substantially the same as the diagram in FIG. 1 with some modifications and with the inclusion of absorber 100. Those elements of the system which are unchanged are given the same numbers in both diagrams. For example, line 36 is shown connected to lean liquid absorbent inlet 102 in absorber 100 and rich liquid absorbent outlet 104 connects to line 26. The position of heat exchanger 32 may also be relocated to cool the regenerated glycol in line 48 downstream of pump 34 in line 36 as shown in FIG. 2.

What is claimed is:

1. The method of reconcentrating a liquid absorbent including the steps of heating rich liquid absorbent to vaporize a substantial portion of the absorbed vapors therefrom, flashing the partially reconcentrated liquid absorbent from said heating step to subatmospheric pressure to vaporize additional absorbed vapors therefrom, heating the flashed liquids and vapors to replace the heat loss due to the vaporization of some of the liquids being flashed, separating liquids from the vapor produced in said flashing step, condensing liquids by cooling the separated vapors, and reintroducing the condensed liquids and vapors from said condensing step into said heating step.

2. The method of reconcentrating a liquid absorbent, including the steps of heating rich liquid absorbent to vaporize a substantial portion of the absorbed vapors therefrom, flashing the partially reconcentrated liquid absorbent from said heating step to subatmospheric pressure to vaporize additional absorbed vapors therefrom, heating the flashed liquids and vapors to replace the heat loss due to vaporization of some of the liquids being flashed, separating liquids from the vapor produced in said flashing step, controlling the flashing of liquid responsive to the liquid level in said separation step to prevent discharge of vapors with separated liquid from the separation step, condensing liquids by cooling the separated vapors, and reintroducing the condensed liquids and vapors from said condensing step into said heating step.

* * * * *